United States Patent
Dees et al.

(10) Patent No.: US 10,628,419 B2
(45) Date of Patent: *Apr. 21, 2020

(54) MANY-CORE ALGORITHMS FOR IN-MEMORY COLUMN STORE DATABASES

(71) Applicant: SAP SE, Walldorf (DE)

(72) Inventors: Jonathan Dees, Karlsruhe (DE); Peter Sanders, Karlsruhe (DE); Franz Faerber, Walldorf (DE); Jochen Seidel, Zurich (CH)

(73) Assignee: SAP SE, Walldorf (DE)

( * ) Notice: Subject to any disclaimer, the term of this patent is extended or adjusted under 35 U.S.C. 154(b) by 521 days.

This patent is subject to a terminal disclaimer.

(21) Appl. No.: 15/240,432

(22) Filed: Aug. 18, 2016

(65) Prior Publication Data

US 2016/0357816 A1 Dec. 8, 2016

Related U.S. Application Data

(63) Continuation of application No. 14/566,953, filed on Dec. 11, 2014, now Pat. No. 9,424,313, which is a continuation of application No. 13/332,189, filed on Dec. 20, 2011, now Pat. No. 8,914,353.

(51) Int. Cl.
*G06F 16/2453* (2019.01)

(52) U.S. Cl.
CPC .. *G06F 16/24544* (2019.01); *G06F 16/24542* (2019.01)

(58) Field of Classification Search
CPC .. G06F 17/30466; G06F 17/463; G06F 17/30; G06F 17/3046; G06F 17/30451; G06F 17/30286; G06F 17/30315; G06F 17/30321; G06F 17/30386; G06F 17/30424; G06F 17/30442; G06F 16/24544; G06F 16/24542
See application file for complete search history.

(56) References Cited

U.S. PATENT DOCUMENTS

| | | | |
|---|---|---|---|
| 5,842,196 A | * | 11/1998 | Agarwal ............ G06F 16/2246 |
| 6,092,063 A | | 7/2000 | Cheng et al. |
| 6,466,931 B1 | | 10/2002 | Attaluri et al. |
| 6,502,089 B1 | * | 12/2002 | Amundsen ........ G06F 17/30439 |
| | | | 707/714 |
| 6,985,904 B1 | | 1/2006 | Kaluskar et al. |

(Continued)

OTHER PUBLICATIONS

Sanders et al. "Intersection in Integer Inverted Indices". 2006. Universität Karlsruhe/SAP AG. 22 Pages (Year: 2006).*

(Continued)

*Primary Examiner* — James E Richardson
(74) *Attorney, Agent, or Firm* — Mintz, Levin, Cohn, Ferris, Glovsky and Popeo, P.

(57) ABSTRACT

A pattern can be identified in at least part of a query whose definition is received in a query request. The identified pattern can be matched with a set of pre-defined patterns, each of which has associated therewith at least one pre-compiled query execution sub-component of a plurality of pre-compiled query execution sub-components retained in a library. A plan for executing the query can be generated, for example by incorporating the pre-compiled query execution sub-component associated with the matched pattern into the plan based on a pseudo code representation of the plan derived from the definition.

16 Claims, 6 Drawing Sheets

(56) References Cited

U.S. PATENT DOCUMENTS

| | | | |
|---|---|---|---|
| 7,464,071 | B2 | 12/2008 | Galindo-Legaria et al. |
| 8,224,806 | B2 | 7/2012 | Al-Omari et al. |
| 8,914,533 | B2 | 12/2014 | Cho et al. |
| 2003/0028509 | A1 | 2/2003 | Sah et al. |
| 2004/0098372 | A1 | 5/2004 | Bayliss et al. |
| 2004/0098374 | A1 | 5/2004 | Bayliss et al. |
| 2005/0028134 | A1 | 2/2005 | Zane et al. |
| 2005/0187977 | A1 | 8/2005 | Frost |
| 2006/0004695 | A1 | 1/2006 | Day et al. |
| 2006/0004696 | A1 | 1/2006 | Day et al. |
| 2006/0218123 | A1* | 9/2006 | Chowdhuri ....... G06F 17/30445 |
| 2008/0091645 | A1 | 4/2008 | Gay |
| 2008/0109424 | A1* | 5/2008 | Day .................. G06F 16/2455 |
| 2008/0177722 | A1 | 7/2008 | Lohman et al. |
| 2008/0256024 | A1 | 10/2008 | Downer et al. |
| 2008/0256025 | A1 | 10/2008 | Bestgen et al. |
| 2009/0164412 | A1 | 6/2009 | Bestgen et al. |
| 2010/0106724 | A1 | 4/2010 | Anderson |
| 2010/0250518 | A1* | 9/2010 | Bruno ............... G06F 17/30386 707/718 |
| 2012/0191698 | A1 | 7/2012 | Albrecht et al. |

OTHER PUBLICATIONS

Krikellas, Konstantinos et al. "Generating code for holistic query evaluation." 2010 *IEEE 26th International Conference on Data Engineering (ICDE 2010)*, IEEE, Piscataway, NJ, USA, Mar. 1, 2010 (Mar. 1, 2010), pp. 613-624. XP031657906,ISBN: 978-1-4244-5445-7.

Neumann, Thomas. "Efficiently Compiling Efficient Query Plans for Modern Hardware." *Proceedings of the VLDB Endowment*, vol. 4, No. 9, Jun. 1, 2011 (Jun. 1, 2011), pp. 539-550. XP055306518, New York, NY. ISSN: 2150-8097, DOI: 10.14778/2002938.2002940.

"Prepared Statement", dated Oct. 7, 2011, from Wikipedia, Retrieved from the Internet: [URL:http://en.wikipedia.org/w/index.php?title=Prepared_statement&oldid=454416721], retrieved on Jul. 23, 2013, 3 pages.

Abadi, et al., Column-Stores vs. Row-Stores: How different are they really?, Proceedings of the 2008 ACM SIGMOD conference, 2008, pp. 967-980.

Akal, et al., OLAP query evaluation in a database cluster: A performance study on intra-query parallelism, Advances in Databases and Information Systems, LNCS, 2002, pp. 181-185, vol. 2435.

Anh, et al., Inverted index compression using word-aligned binary codes, Information Retrieval, pp. 151-166, vol. 8.

Anh, et al., Index compression using 64-bit words. Software: Practice and Experience [Abstract], 2010, pp. 131-147, vol. 40, No. 2.

Apostolico, et al., The Boyer-Moore-Galil string searching strategies revisited. SIAM J. of Computing, 1986, pp. 98-105, vol. 15, No. 1.

Baru, et al., Db2 parallel edition. IBM Systems Journal, 1995, pp. 292-322, vol. 34, No. 2.

Boncz, et al., MIL primitives for querying a fragmented world. The VLDB Journal, 1999, pp. 101-119, vol. 8, No. 2.

Boncz, et al., MonetDB/X100: Hyper-pipelining query execution, Proc. CIDR, 2005, pp. 225-237, vol. 5.

Boyer, et al., A fast string searching algorithm, Communications of the ACM, 1977, pp. 762-772, vol. 20, No. 10.

Dewitt, et al., Parallel database systems: the future of high performance database systems, Commun. ACM, Jun. 1992, pp. 85-98, vol. 35.

Golomb, et al., Run-length encodings (corresp.), Information Theory, IEEE Transactions on, 2002, pp. 399-401, vol. 12, No. 3.

Kleen, A NUMA API for Linux, Novel Inc, 2005.

Levene, et al., Why is the snowflake schema a good data warehouse design? Inf. Syst., May 2003, pp. 225-240, vol. 28.

Manegold, et al., Optimizing main-memory join on modern hardware, IEEE Trans. on Knowl. and Data Eng., Jul. 2002, pp. 709-730, vol. 14.

McCalpin, et al., A survey of memory bandwidth and machine balance in current high performance computers, IEEE TCCA Newsletter, 1995, pp. 19-25.

Pankratius, et al., Parallel SQL query auto-tuning on multicore, Technical report, Karlsruhe Institute of Technology, 2011, 13 pages.

Stonebraker, et al., C-store: a column-oriented DBMS. In Proceedings of the 31st VLDB conference, 2005, pp. 553-564.

Verghese, et al., Operating system support for improving data locality on CC-NUMA compute servers, SIGPLAN Not., Sep. 1996, pp. 279-289, vol. 31.

Zukowski, et al., Super-scalar RAM-CPU cache compression, In Proceedings of the 22nd ICDE'06 conference, 2006, p. 59.

\* cited by examiner

MANY-CORE ALGORITHMS FOR IN-MEMORY COLUMN STORE DATABASES

TECHNICAL FIELD

The subject matter described herein relates to improving performance of database applications in many-core processing environments.

BACKGROUND

Several recent developments have enabled significantly improved performance of relational databases. For example, column-based storage, in which each column is separately stored, can reduce the amount of data that must be accessed for typical queries that use only a small fraction of the columns present in large-scale commercial or industrial databases.

Additionally, ongoing reductions in the cost of random access memory (RAM) have facilitated storage of fairly large databases entirely in main memory. This factor can greatly improve the available bandwidth and reduce latencies by several orders of magnitude. In-memory approaches can also mitigate a potential disadvantage of column-store databases, which can in some examples have a more fine-grained memory access pattern than row-store representations. This benefit can be further amplified by the ease with which column-based data stores can be compressed. Compression can further decrease memory cost and also save on memory bandwidth.

Many-core processors can provide high processing power at relatively low cost. In contrast to cluster-based systems, the shared memory of many-core systems can provide greatly improved flexibility of access to the stored data. With rate of improvement in the speed of individual processor cores continuing to slow, parallelization has become the dominant avenue for accelerating the performance of processor-intensive applications. For database applications in particular, better performance can have one or more of several practical implications. Additional processing ability can assist with handling of rapidly growing data sets. Improving efficiency can also provide savings of hardware and energy costs as well as the ability to launch additional new applications in parallel. For example, previously available decision support queries have typically been applied by a small number of people to make strategic decisions tolerating long latencies. With two orders of magnitude lower query latencies, multiple expensive queries can be simultaneously supported for a large number of users who expect instantaneous or at least nearly instantaneous query responses, for example, as are generally expected for web search engines.

SUMMARY

In one aspect, a computer-implemented method includes receiving a query request comprising a definition of a query of a database persisted in a column-based storage, identifying a pattern in at least part of the query, matching the identified pattern with a set of pre-defined patterns, generating a plan for executing the query, and executing the query using the generated plan. Each of the pre-defined patterns is associated at least one pre-compiled query execution sub-component of a plurality of pre-compiled query execution sub-components retained in a library. The generating includes incorporating the pre-compiled query execution sub-component associated with the matched pattern into the plan based on a pseudo code representation of the plan derived from the definition.

In some variations one or more of the following features can optionally be included in any feasible combination. Based on the matching of the identified patterns with the set of pre-defined patterns, an optimal sequence for processing a plurality of tables that must be joined to respond to the query can optionally be selected, and the plan can optionally be configured to include the optimal sequence for processing the plurality of tables. The pseudo code representation of the plan can optionally be derived from the definition of the query. The generating can optionally further include creating a single function to call the pre-compiled query execution component and the one or more other pre-compiled query execution components to generate the plan. The single function can optionally define a desired result and can optionally access a predefined parallelization plan from a set of two or more predefined parallelization plans based at least in part of the matching of the identified pattern. The pre-compiled query execution sub-component can optionally include one or more pre-compiled SQL operations expressed in C++.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
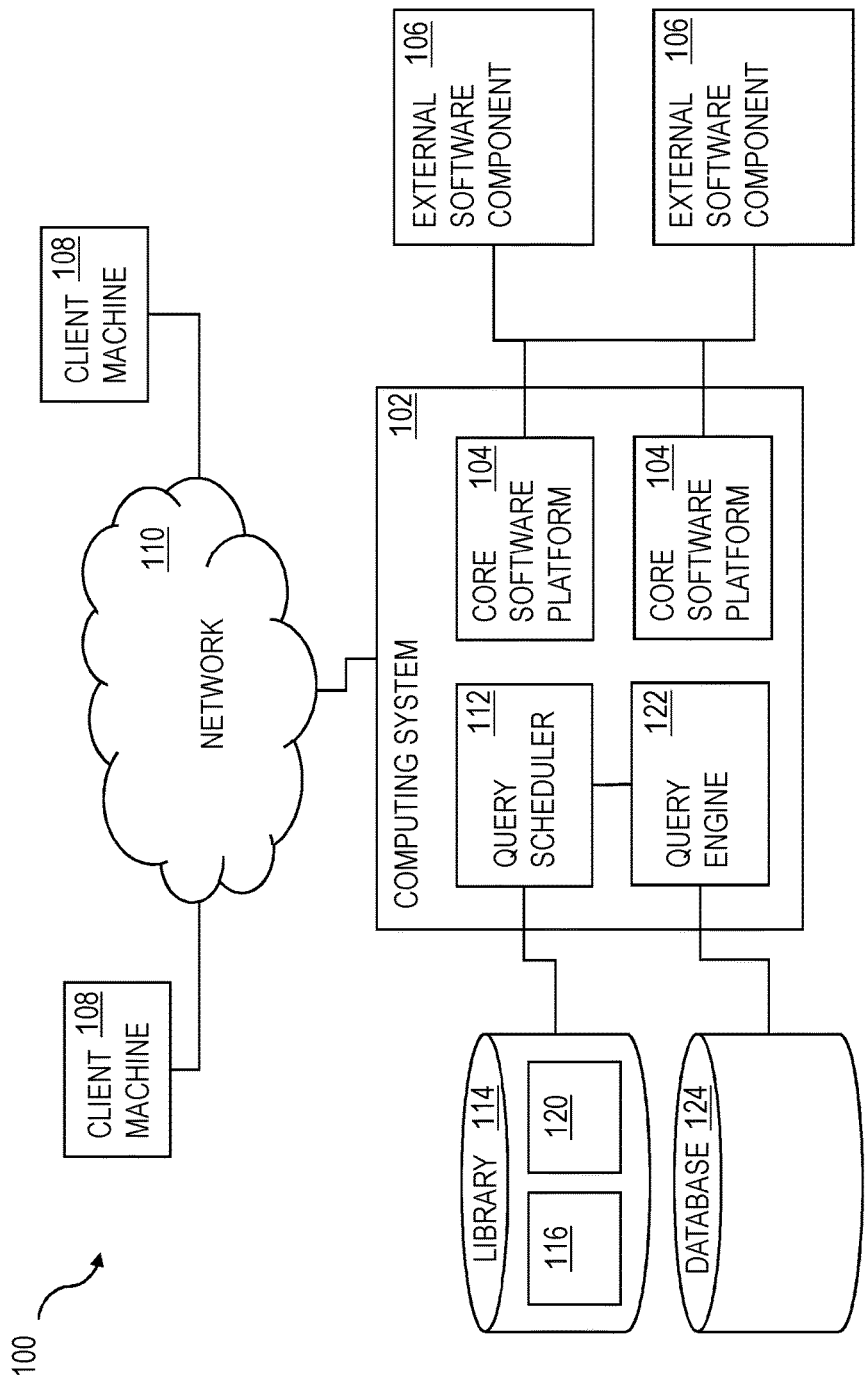
FIG. 1 is a diagram illustrating features of a business software system architecture consistent with at least some implementations of the current subject matter.

In previously available approaches, execution of a query generally includes generation of a query plan. A typical query plan generates multiple intermediate results and can include a lengthy series of recursive features (e.g. "FOR" or "LOOP" or "DO" statements) that require multiple passes through the database to return the requested results. This approach can be quite unwieldy and can further present difficulties in optimizing query execution in a many-core processor system. Methods, systems, articles of manufacture, and the like consistent with one or more implementations of the current subject matter can, among other possible advantages, provide improved performance of parallel main memory-based database applications, for example the In-Memory Computing Engine (IMCE) available from SAP AG (Walldorf, Germany). In some examples, expensive multiple recursions and generation of large amounts of intermediate results can be avoided by assembling pre-coded "pseudo-code" operators and the like based on the results of a pattern analysis of the query definition provided in an incoming query request. Rather than requiring multiple recursions, some implementations of the current subject matter can be capable of generating results in a greatly reduced number of passes through a tables, thereby substantially improving query execution speed and system resource usage. In some examples, only a single pass can be required.

On modern shared-memory machines, for example those with cache-coherent non-uniform memory architectures (CC-NUMA), it can be possible to decrease memory bandwidth bottlenecks by preferably directing memory access to RAM modules that are directly attached to the processor socket. Currently available database management systems are not believed to use explicit access patterns to favor local memory node access. One currently available option involves leaving this decision to the operating system using page-by-page statistics on cache misses. However, currently available systems appear to lack the necessary hardware support to implement such an approach.

Implementations of the current subject matter can optionally be employed on shared memory machines with multiple sockets each containing a multi-core processor with a significant number of cores and simultaneously executing threads. Each socket can have its own locally attached main memory. Accessing memory of other sockets can result in a performance penalty relative to accessing using local memory. A complex hierarchy of caches can be included. With increasing cache size, latency can increase, and more threads share the same instantiation of this cache.

Implementations of the current subject matter can improve the efficiency of computations involved in decision support queries, such as for example the TPC Benchmark™ H (TPC-H, available from the Transaction Processing Performance Council, San Francisco, Calif.), by as much as one to two orders of magnitude relative to previously available approaches. Column-based in-memory storage and modern many-core processors, preferably with large main memories can be used in conjunction with highly tuned algorithms such as those described herein to provide an overall performance sufficient to enable instantaneous or nearly instantaneous delivery of results on all data that can be maintained within the system memory. Accordingly, implementations of the current subject matter can be used to drive very flexible decision support systems without restriction to prearranged aggregations such as data-cubes. Real time or near real time queries supported by implementations of the current subject matter can be used routinely in a wide range of applications without producing unbearable computational costs and energy consumption. Features similar to those described herein can be used both in conjunction with static databases, which are generally queried using a software library that is considerably lower level than SQL, and with C++ (or other language) queries generated by an appropriate SQL query compiler.

Insertions and deletions to a database can, in some implementations of column-based storage, be buffered in a small, dynamic delta-database or delta partition. New or updated records can be inserted into the delta partition rather than into the main partition of a column, table, or database so that a main partition can retain a compressed structure to maximize the efficiency of searches on the data in that column, table, or database. Direct insertion of new or updated records into a compressed main partition is generally not possible because the compression changes the structure of the column. A search of the current data in the column can therefore require traversal of the one or more main partitions followed by a traversal of the delta partition(s). Queries can then be composed from separate queries to the main database and delta database or delta partition, respectively. From time to time the main database and the delta database or delta partition are merged, for example as the delta grows sufficiently in size to hinder the efficiency of searches. When a query request is received, a join of results from the main and delta databases can be required.

To allow interactive latencies on larger databases, clusters of many-core servers can be employed consistent with one or more implementations of the current subject matter. Relatively low processing overhead can be maintained in such a parallelized system by replicating smaller-scale database relations that can be accessed randomly in a non-distributed system. Larger-scale database relations can be distributed approximately evenly over the cluster nodes of a many-core system, which can be scanned in parallel. Hybrid systems, in which less frequently used columns are stored on disk (e.g. a hard drive, a solid state drive, or the like) can also be employed to handle larger databases at a reasonable cost.

Database schema compatible with implementations of the current subject matter can include, but are not limited to, generalizations of snowflake schema, star schema, and the like. The table relations in such schema can in some examples form a directed acyclic graph G where an edge (R,U) between two nodes R and U indicates that a tuple of relation R references a tuple of relation U. The graph need not form a tree. Paths in the directed acyclic graph G can specify a way to access data via a sequence of key dereferencing operations. From the point of view of a node R, the directed acyclic graph G can be viewed as a compact representation of a closure relation R* that contains an attribute for every path starting at R. In snowflake scheme, the schema directed acyclic graph G can be a tree. In star schema, the tree has a depth of one.

One or more columns of a database can be split into blocks, which can be assigned to the local memories of each socket of a NUMA machine in a round robin fashion. The blocking can enhance cache efficiency while the round robin distribution can provide approximately equally loaded memory banks each sufficiently large range of a column that might be accessed. It should be noted that simply splitting a column into one segment for each local memory might yield unacceptable performance since many queries do most of their work on only a subrange of a column. The assignment of memory blocks to sockets can be handled transparently. The application can use a contiguous memory range, for example because such a range can be virtual and can therefore be further translated to physical memory by the operation system. The assignment of virtual to physical addresses can be modified by a system call (e.g. on Linux systems) or the like such that the physical address points to the correct socket. For the size of a memory block a multiple of the system page size can be used as this range is also used for parallel scanning.

Index data structures can permit efficient navigation of the schema graph. Examples of index data structures compatible with implementations of the current subject matter can include, but are not limited to, one or more of forward indices, indexing sorted relations, inverted indices, inverted text indices, and the like.

For columns whose values are correlated with an ordering column, minima and maxima can be stored for each block. For example, in the exemplary TPC-H database, ship dates, commit dates, and receipt dates off line items are strongly correlated with order dates, which can be the primary sorting criterion. This optimization can causes only negligible storage overhead since it stores only two additional values per data block. When the rows of a column lying in range [a, b] are selected, one of five cases is applicable for each block: (1) if min≥a and max≤b, select all rows; (2) if min>b or max<a, no row is selected; (3) if min>a and max∈[a, b], only check for ≤b; (4) if min∈[a,b] and max<b, only check for ≥a; and (5) if min<a and max>b, need to check whether ≥a and ≤b. Except for the last case, an advantage can be gained through this approach. In the first two cases, it is not necessary to touch the values at all, which can save memory bandwidth.

Many SQL queries that are composed as a complicated combination of joins can alternatively be viewed as a simple select-from-where query on a closure relation R* and can be implemented by scanning relation R and accessing attributes corresponding to paths in the schema graph by explicitly following the path using forward indices. Performing these operations efficiently can require a number of optimizations, however. For example, parallelization can be used, in which a given range of a column can be split to be scanned into smaller ranges (blocks) and the blocks can be assigned as tasks to different threads. For small ranges, these blocks need be only a fraction of a memory block in order to allow for enough parallelism and load balancing. In a system that is NUMA-aware, there may be no way to reliably assign a thread to a CPU, so it can be difficult to ensure that the accessed memory resides on the local socket.

To overcome this limitation, a NUMA aware scheduler (referred to herein as NBB) consistent with implementations of the current subject matter can use a similar interface to Threaded Building Blocks (TBB, available from Intel Corp., Santa Clara, Calif.) and can be based on POSIX (Portable Operating System Interface) threads. Implementations of NBB can manage one task pool for every socket, which may contain tasks from several queries. Worker threads can be fixed to a particular socket and can try to execute tasks from their local task queue. If no such task is available for a thread, it can be permissible to allow a socket to "steal" blocks from a distant socket.

The where-clause of conventionally formatted queries can restrict the set of tuples actually contributing to the output. Often, this restriction is a conjunction of several predicates. In a column-store database, the order in which these predicates are tested can be an important factor impacting performance. It can generally be advantageous to test the most restrictive predicates first. However, the cost of evaluating a predicate must also be considered, in particular the access cost for the involved data. Hence, choosing an optimal order in which to test conditions can be an important tuning consideration.

The cost for accessing an attribute of R* defined by a path P can depend not only on the length of the path but also on the size of the involved physical columns. Namely, small columns can often fit in the cache while large columns can more frequently cause additional cache faults. For example, in TPC-H it makes little difference whether one accesses an attribute directly stored with a supplier or stored with the nation of the supplier—the 25 entries of the nation dimension table easily fit in cache.

When scanning a bit-compressed column, the scanning loop can be unrolled so that after each iteration of the unrolled loop, an integer number of machine words have been consumed. In many queries, a substantial portion of the execution time can be spent in one (most inner) loop iterating over data and processing it. Often, the instructions within the loop can depend on each other and must be executed in a certain order, which may cause lost processor cycles. By unrolling the loop, the compiler can be allowed to reorder the instructions to potentially allow a higher number instructions per cycle. In general, the unroll count should not be too large as the code of the loop should advantageously fit into the first level (L1) cache of the respective processor core. In some examples, an unroll count of 8 can be used.

Decision support queries can reduce large data sets by commutative and associative operations, such as for example counting, summing, minimizing, maximizing, or the like over a large number of values. For many queries, the number of results produced can be sufficiently small that a local result table can be computed for each thread participating in the computation. In some cases, this result can even fit into the first level (L1) cache of each respective processor core. Only at the end of the process, the local results can be combined into the overall result. In this manner unnecessary and expensive synchronization overhead can be avoided. To receive the overall result, two local results can be combined into a single result for pairs of remaining results (in parallel). Accordingly, in some implementations the number of parallel steps to receive the overall result can be expressed as $\lceil \log_2(\text{number of threads})\rceil$ using a scheduling framework as discussed herein. If the produced results do not fit into the second level (L2) cache, we a different method can be used (for example, queries 10 and 15 in TPC-H do not fit into the L2 cache). In such a case, the final result table can be divided into different parts such that each of the parts fits into the L2 cache. In one example implementation, 256 parts can be used and divided based on the most significant bits of the (hash) key. The aggregation can be done in two passes or optionally in more than two passes.

In a first pass, each thread can order the input by its respective part. In more detail, each thread can process a block of the input and copy each row (key and value) to an array corresponding to the final part result part. To minimize synchronization, each thread can hold its own array for each result part. In some examples, it can be desirable to copy only a pointer to the row if copying is more expensive than following the pointer later. In the second pass, the threads can produce the final result part by part. For each part, one thread can process the rows in the corresponding array of each thread and aggregate them directly into the final result table. Here, no synchronization is necessary as the parts are disjoint. Also, the result part remains in cache and thus the aggregation is very efficient.

To gain full performance, memory allocation should be done carefully. Note that each row to aggregate is advantageously copied once (or at least a pointer). The number of rows to be copied into the arrays is not known in advance. This can result in excessive dynamic memory allocation requirements, which can in many instances be synchronized between threads, thereby significantly reducing the performance. To overcome this problem, a thread local memory pool can be used to hold a number of memory chunks, which can be reused between different queries. In some examples, the performance gain of using a thread local memory pool was more than factor 2.

An illustrative example involves performing computations on tuples from a closure relation R*, which involves a highly selective predicate P depending only on a closure relation U*, and in which an index inverts the path from R to U. Rather than scanning R and performing expensive indirect accesses to the attributes from U*, it can be advantageous to scan U and use the index to retrieve only those tuples of R for which the predicate P is fulfilled. Using inverted indices can exhibit parallelism at two levels of granularity—when scanning U, and when scanning an inverted list for a particular tuple u∈U.

Beyond this most common standard use of indices it can also be possible to combine several index results. When indices are available for several sufficiently selective predicates, the intersection of the index results can be computed directly. For inverted index data structures, this can be a standard operation known from information retrieval. In particular, a pairwise intersection can be computed in time proportional to the smaller set if the inverted lists are represented appropriately. The sets of intervals obtained from the sorting of relations and the mixed case can also be efficiently intersected.

In an example of performing computations on tuples from a closure relation R*, which involves computing some predicate or value x that only depends on data in a closure relation U*, which contains far less tuples than R, it can be possible to pre-compute these values and cheaply store them in a temporary column X This approach can be beneficial if evaluating x is considerably more expensive than accessing X, which can be true even for very simple computations. For example, if x is a predicate, then X is merely a bit array that is more likely to fit into the cache. In some implementations, this technique can be particularly useful if the computation involves complicated string operations (for example in TPC-H Query 13).

For queries that output only the k largest or smallest results in sorted order, it can be advantageous to avoid sorting all results or consuming a lot of temporary memory. These steps can be avoided by dropping unneeded results if the number of temporary results exceeds k by a certain factor (e.g. 4). A fast implementation of the Boyer-Moore algorithm can be used for string matching problems in example where there is no available index.

Most predicates on dates can be reduced to comparisons between integers. A very fast way to extract the year y out of a date represented as number of days d since Jan 1st 1970 (or any other starting date) without storing a full lookup table can be provided by the following approach consistent with implementations of the current subject matter:

$$y=YT[d \gg 8] \cdot \text{base} + ((d \& 255) > YT[d \gg 8] \cdot \text{offset})$$

where the pre-computed table YT[i] stores the year of day 256i and the number of days remaining of this year at day 256i. Note that this table can generally fit into the L1 cache. Months or days within a month can be extracted in similar ways.

FIG. 1 shows a diagram of a system that can implement one or more features of the current subject matter. A computing system 102 can include one or more core software platform modules 104 providing one or more features of a business software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A query scheduler 112 or other comparable functionality can access a library 114 that includes a library of pre-compiled query sub-components 116 and a set of pattern definitions 120. The query scheduler 112 can process one or more parts of a query definition associated with a query received from a client 108. The processing can include matching the one or more parts to one or more pattern definitions in the set of pattern definitions 120 and retrieve from the library 116 an associated pre-compiled query sub-component for inclusion in the query plan for executing the requested query. A query engine 122 can execute the query plan on one or more databases 124 accessible by the computing system 102 in order to return results that are responsive to the query request.

Figure 2:
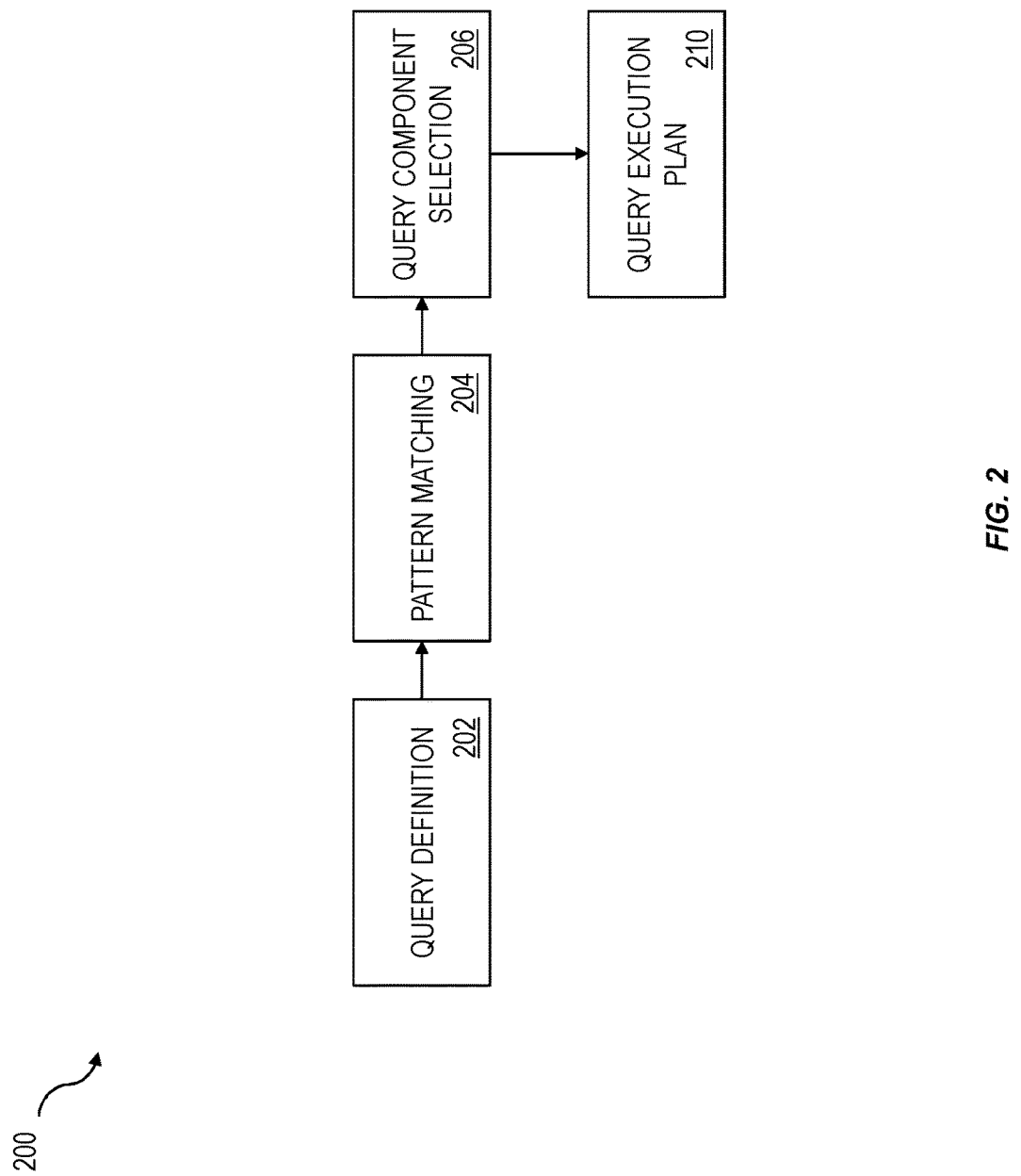
FIG. 2 is a diagram illustrating an operation flow consistent with at least some implementations of the current subject matter.

FIG. 2 shows a diagram 200 illustrating the processing of a query definition 202 by applying pattern matching 204 with the pattern definitions 120 and selection of one or more pre-compiled query components 206 from a query component library 116 followed by assembly of the query execution plan 210.

Figure 3:
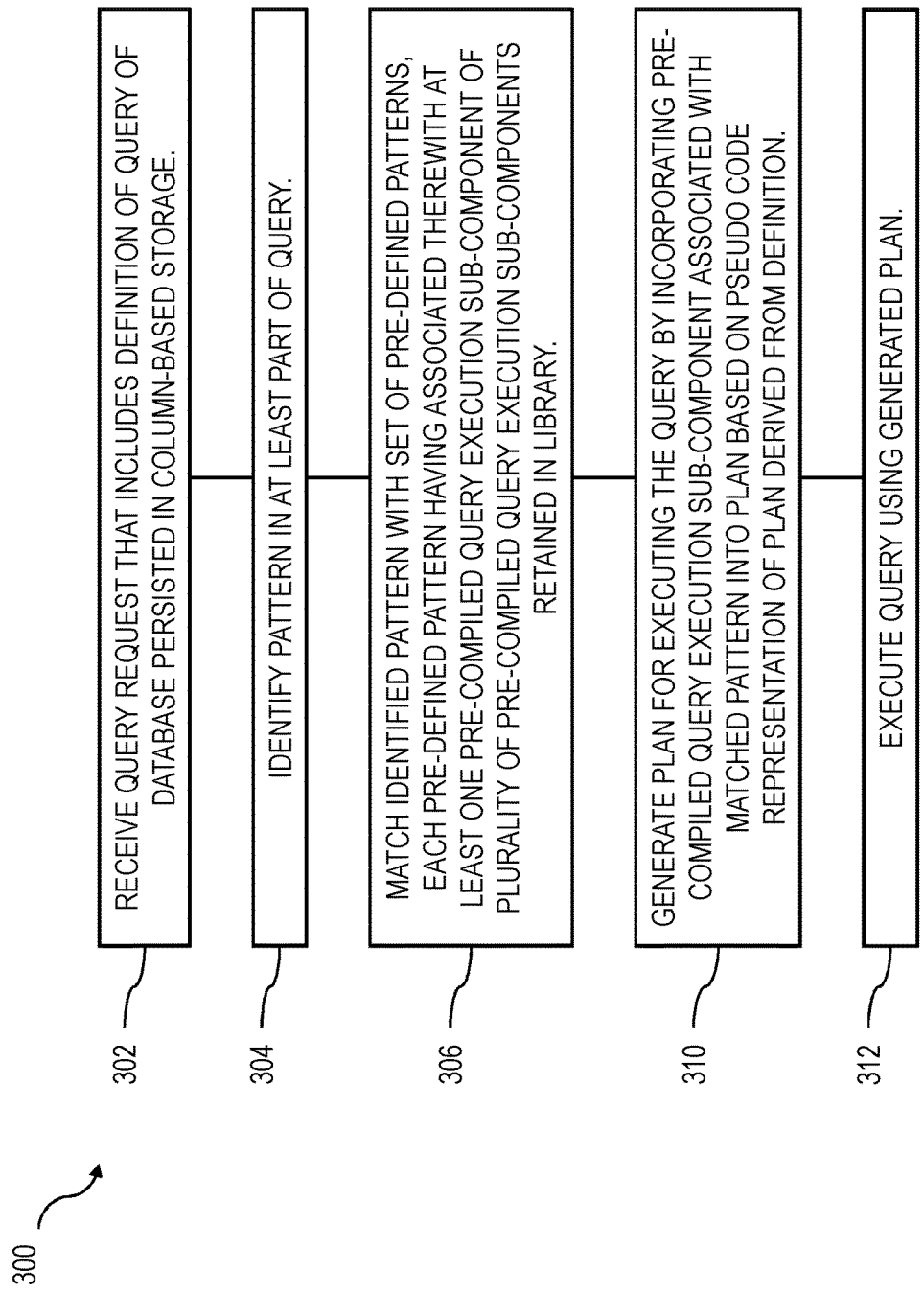
FIG. 3 is a process flow diagram illustrating aspects of a method having one or more features consistent with at least some implementations of the current subject matter.

FIG. 3 shows a process flow chart 300 illustrating method features, one or more of which can be included in implementations of the current subject matter. At 302, a query request that includes a definition of a query of a database persisted in a column-based storage can be received, for example by a query scheduler 112. After identifying a pattern in at least part of the query at 304, the identified pattern is matched at 306 with a set of pre-defined patterns, each which is associated with at least one pre-compiled query execution sub-component of a plurality of pre-compiled query execution sub-components retained in a library. At 310, a plan for executing the query is generated, at least in part by incorporating the pre-compiled query execution sub-component associated with the matched pattern into the plan based on a pseudo code representation of the plan derived from the definition. The query can be executed using the generated plan at 312.

In some implementations, query sub-component for use in specific, frequently repeated query operations can include pseudo code that is pre-prepared, pre-compiled (e.g. before run time), and stored in a library. Upon receiving a request for a query, a query scheduler 112 can perform operations that can include identifying patterns in a query definition or at least part of a query definition and, based on those patterns, generating a query execution plan by assembling one or more pre-defined, pre-compiled code segments. A query scheduler 112 consistent with some implementations can access both local memory and memory on other processor cores or sockets.

For a given query, several options are generally available to accomplish the execution. Many queries require one or more joins between two or more tables. In implementations of the current subject matter, the pattern recognition can be further applied to determine a preferred order of the joins or other database operation that, instead of creating multiple intermediate results that must be retained and/or passed to other threads, perfumed the entirety of the query in a single pass. The pattern recognition can be performed on multiple sub-parts of the query, and can be used to identify pre-compiled query execution sub-components and/or joins or other operation ordering that are optimized for each part of the query.

Implementations of the current subject matter can enable very rapid compiling of a query using a parallelization framework. The library of pre-compiled query execution sub-components (e.g. optimized code segments) can reduce or even eliminate the need for some of this compiling. In this manner, the part of the query that requires compiling at the time of query execution can be substantially reduced. A relatively simple, single function can then be generated to call the one or more pre-compiled query execution components to generate the query plan for execution. The single function can define a desired result, and can access a predefined parallelization plan from a set of two or more predefined parallelization plans.

Unlike a conventional database that can include a set of stored procedures that serve to perform operations that cannot be readily completed in SQL or another high level database language, implementations of the current subject matter can include pre-compiled SQL operations expressed in C++ or some other programming language for rapid execution. For example, low level aspects of the available processing machines, for example NUMA aware data layouts; single instruction, multiple data (SIMD) instructions; parallelization; thread scheduling; (de)compression; data layout, etc. can be encapsulated in a library of pre-compiled, generic C++ segments. A query compiler of an application programmer can generate queries without knowing about the details of the machine or about many-core programming. By recompiling, these query codes can be adapted to different platforms.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 4:
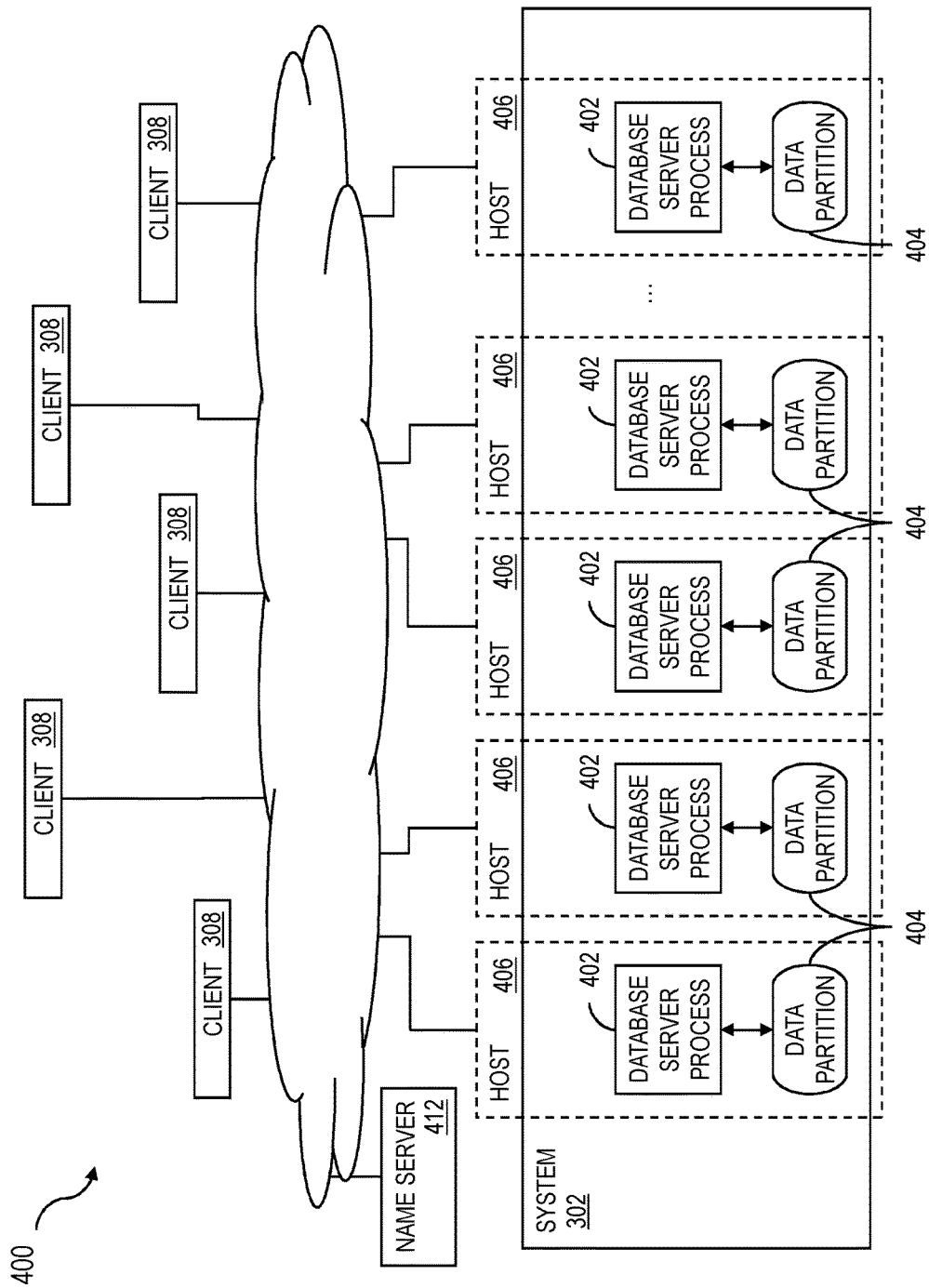
FIG. 4 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 4 shows an example of an enterprise resource system architecture 400 consistent with an implementation that includes data distribution for scalability reasons. Such a configuration can be used for large, on-premise or stand-alone systems with high performance requirements. Each data server process 402 and its associated data partition 404 can be assigned to a discrete host 406. A host 406 can be a standalone machine with one or more physical processors or a virtual machine on a larger system 302 as depicted in FIG. 4. A central component, labeled as a name server 412 in FIG. 4, knows the topology of the system and how data is distributed. In a system with data distribution, the name server knows which tables or partitions of tables are located on which data server process 402. One or more clients 414 (e.g. client machines 108) can access the name server 412, either via a direct connection or over a network 416.

In a data distribution scenario, the partitioning can be done table wise or also by splitting tables. With table wise partitioning, the name server assigns new tables to a database server process 402 based on the current distribution of tables (number of tables assigned to each database server process 402). Then data for this table will reside only on that database server process 402. It is also possible to specify that a table is split over multiple database server processes 402. The name server 412 can optionally partition the table based on a size estimation specified by the application. When records are inserted into a split table, the records can be distributed to other database server processes 402 based on name server information.

Smaller organizations can also benefit from use of business software functionality. However, such an organization may lack the necessary hardware resources, IT support, and/or consulting budget necessary to make use of a stand-alone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
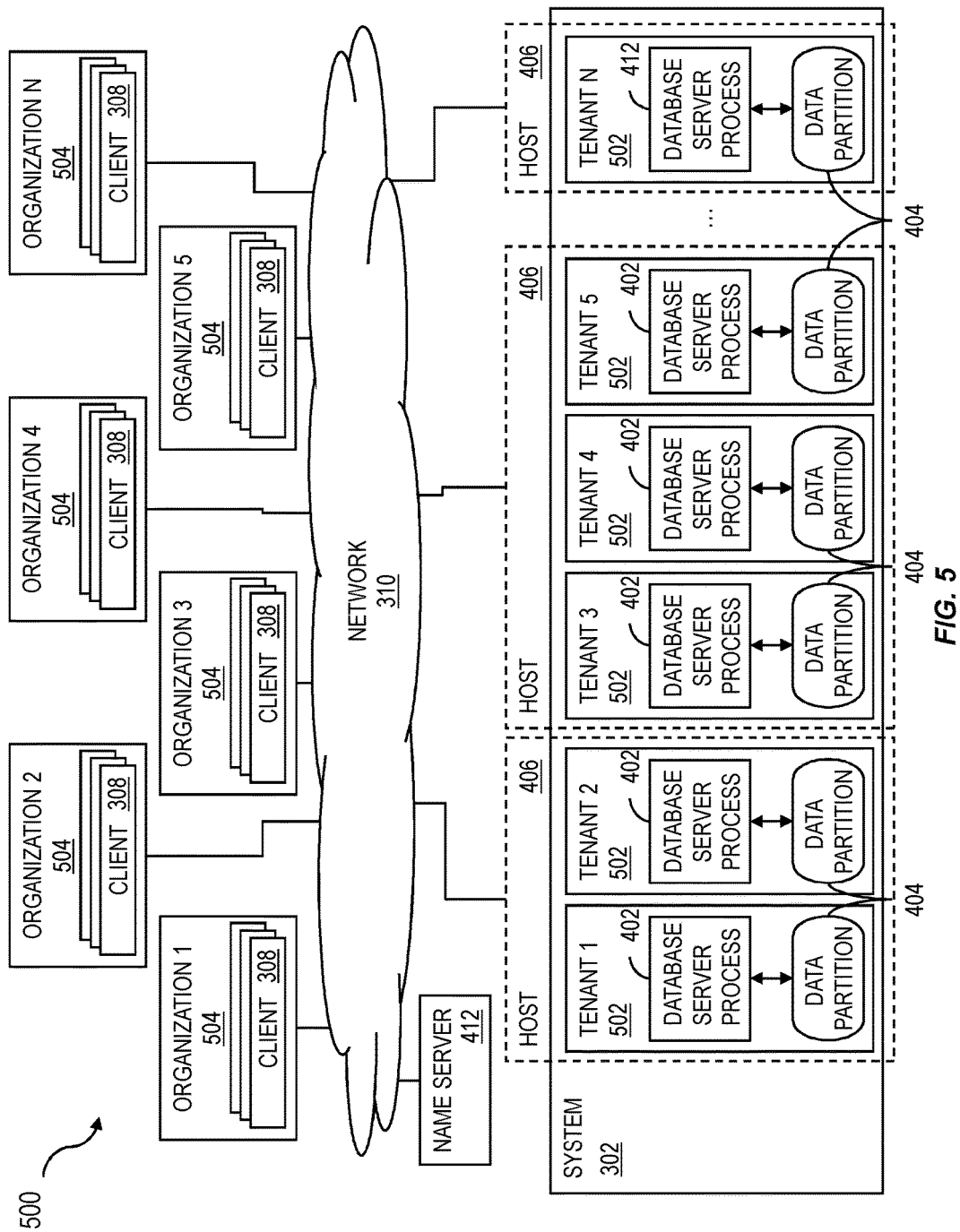
FIG. 5 is a diagram illustrating features of another database management system architecture consistent with at least some implementations of the current subject matter.

Data partitioning consistent with implementations of the current subject matter can also be used in a multi-tenancy environment as illustrated in the system architecture 500 of FIG. 5. Multiple tenants 502, each isolated from one another and available to be accessed by clients 414 within a separate organization 504 of a plurality of organizations via a network 416, can be hosted by a same host 406, which can be a virtual machine on a larger system 302 as shown in FIG. 5 or a separate system that includes one or more physical processors. Tenants 502 can also optionally be distributed across multiple database server processes 402 on more than one host 406. In this manner, tables or ranges within tables are assigned to different database server processes 402 that are assigned to different hosts 406 for scalability reasons. One or more tenants 502 can alternatively be served by a single database server process 402 accessing a data partition 404 (or multiple data partitions 404) for the respective tenant 502 that is isolated from other tenants 502.

Figure 6:
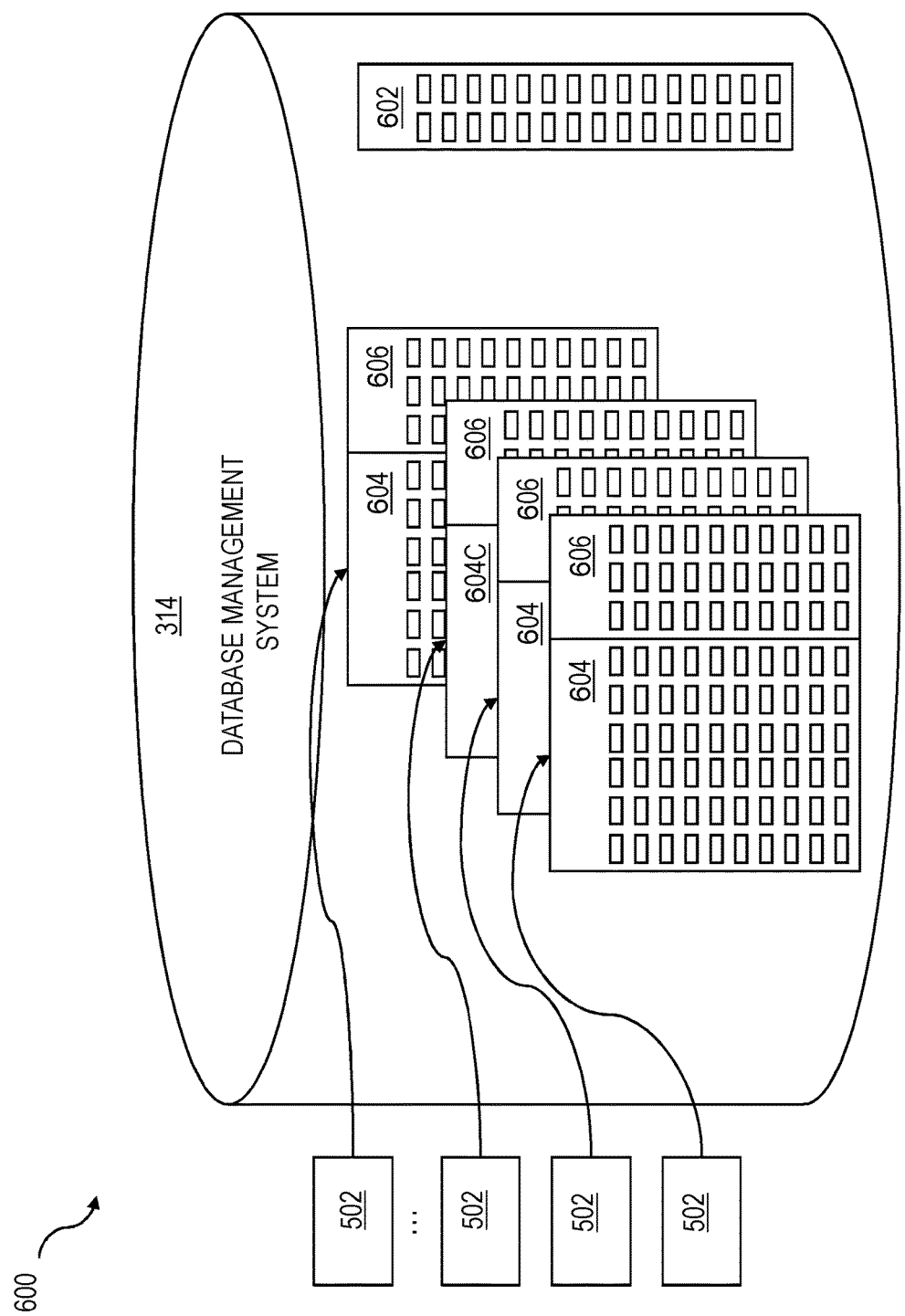
FIG. 6 is a diagram illustrating features of a multi-tenancy database structure consistent with at least some implementations of the current subject matter.

To provide for customization of the business process for each of multiple organizations supported by a single software delivery architecture 500, the data and data objects stored by a database management system 314 can include three types of content as shown in FIG. 6: core software platform content 602 (e.g. a standard definition of a business process), system content 604, and tenant content 606. Core software platform content 602 includes content that represents core functionality and is not modifiable by a tenant. System content 604 can in some examples be created by the runtime of the core software platform and can include core data objects that store concrete data associated with specific instances of a given business process and that are modifiable with data provided by each tenant. The data retained in these data objects are tenant-specific: for example, each tenant 502 of the group of tenants can store information about its own inventory, sales order, etc. Tenant content 606 for isolated to each tenant 502 of the group of tenants includes data objects or extensions to other data objects that are customized for one specific tenant 502 of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 602 and system content 604 and tenant content 606 of a specific tenant 502 of the group of tenants are accessed to provide the business process definition and/or the status information relating to a specific instance of the business process according to customizations and business data of that tenant such that each tenant 502 of the group of tenants is provided access to a customized solution whose data are available only to users from that tenant 502.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product storing instructions that, when executed by at least one programmable processor, cause the at least one programmable processor to perform operations comprising:
receiving a query request comprising a definition of a query of a database persisted in a column-based storage;
identifying a pattern in at least part of the query;
matching the identified pattern with a set of pre-defined patterns, each of the pre-defined patterns having associated therewith at least one pre-compiled query execution sub-component of a plurality of pre-compiled query execution sub-components retained in a library;
selecting, based at least on the matching of identified patterns, an optimal sequence for processing a plurality of tables that must be joined to respond to the query, the optimal sequence avoids intermediate results to at least enable the query to be executed in a single pass of the database;
generating a plan for executing the query, the generating of the plan comprising incorporating, into the plan, the optimal sequence for processing the plurality of tables, and the generating of the plan further comprising incorporating, into the plan, the pre-compiled query execution sub-component associated with the matched pattern into the plan based on a pseudo code representation of the plan derived from the definition; and
executing the query using the generated plan.

2. A computer program product as in claim 1, wherein the operations further comprise deriving the pseudo code representation of the plan from the definition.

3. A computer program product as in claim 1, wherein the generating further comprises creating a single function to call the pre-compiled query execution component and the one or more other pre-compiled query execution components to generate the plan.

4. A computer program product as in claim 3, wherein the single function defines a desired result and accesses a predefined parallelization plan from a set of two or more predefined parallelization plans based at least in part of the matching of the identified pattern.

5. A computer program product as in claim 1, wherein the pre-compiled query execution sub-component comprises one or more pre-compiled SQL operations expressed in C++.

6. A system comprising:
at least one programmable processor; and
a machine-readable medium storing instructions that, when executed by the at least one processor, cause the at least one programmable processor to perform operations comprising:
receiving a query request comprising a definition of a query of a database persisted in a column-based storage;
identifying a pattern in at least part of the query;
matching the identified pattern with a set of pre-defined patterns, each of the pre-defined patterns having associated therewith at least one pre-compiled query execution sub-component of a plurality of pre-compiled query execution sub-components retained in a library;
selecting, based at least on the matching of identified patterns, an optimal sequence for processing a plurality of tables that must be joined to respond to the query, the optimal sequence avoids intermediate results to at least enable the query to be executed in a single pass of the database;
generating a plan for executing the query, the generating of the plan comprising incorporating, into the plan, the optimal sequence for processing the plurality of tables, and the generating of the plan further comprising incorporating, into the plan, the pre-compiled query execution sub-component associated with the matched pattern into the plan based on a pseudo code representation of the plan derived from the definition; and
executing the query using the generated plan.

7. A system as in claim 6, wherein the operations further comprise deriving the pseudo code representation of the plan from the definition.

8. A system as in claim 6, wherein the generating further comprises creating a single function to call the pre-compiled query execution component and the one or more other pre-compiled query execution components to generate the plan.

9. A system as in claim 8, wherein the single function defines a desired result and accesses a predefined parallelization plan from a set of two or more predefined parallelization plans based at least in part of the matching of the identified pattern.

10. A system as in claim 6, wherein the pre-compiled query execution sub-component comprises one or more pre-compiled SQL operations expressed in C++.

11. A computer-implemented method comprising:
receiving a query request comprising a definition of a query of a database persisted in a column-based storage;
identifying a pattern in at least part of the query;
matching the identified pattern with a set of pre-defined patterns, each of the pre-defined patterns having associated therewith at least one pre-compiled query execution sub-component of a plurality of pre-compiled query execution sub-components retained in a library;
selecting, based at least on the matching of identified patterns, an optimal sequence for processing a plurality of tables that must be joined to respond to the query, the optimal sequence avoids intermediate results to at least enable the query to be executed in a single pass of the database;
generating a plan for executing the query, the generating of the plan comprising incorporating, into the plan, the optimal sequence for processing the plurality of tables, and the generating of the plan further comprising incorporating, into the plan, the pre-compiled query execution sub-component associated with the matched pattern into the plan based on a pseudo code representation of the plan derived from the definition; and
executing the query using the generated plan.

12. A computer-implemented method as in claim 11, further comprising deriving the pseudo code representation of the plan from the definition.

13. A computer-implemented method as in claim 11, wherein the generating further comprises creating a single function to call the pre-compiled query execution component and the one or more other pre-compiled query execution components to generate the plan.

14. A computer-implemented method as in claim 13, wherein the single function defines a desired result and accesses a predefined parallelization plan from a set of two or more predefined parallelization plans based at least in part of the matching of the identified pattern.

15. A computer-implemented method as in claim 11, wherein the pre-compiled query execution sub-component comprises one or more pre-compiled SQL operations expressed in C++.

16. A computer-implemented method as in claim 11, wherein at least one of the receiving, the identifying, the matching, the generating, and the executing is performed by at least one programmable processor.

* * * * *